United States Patent [19]
Ford et al.

[11] Patent Number: 5,530,850
[45] Date of Patent: Jun. 25, 1996

[54] DATA STORAGE LIBRARY ARRAY WITH LOG-STRUCTURED FILE SYSTEM WHICH ALLOWS SIMULTANEOUS WRITE AND GARBAGE COLLECTION

[75] Inventors: Daniel A. Ford, San Jose; Robert J. T. Morris, Los Gatos, both of Calif.

[73] Assignee: International Business Machines Corporation, Armonk, N.Y.

[21] Appl. No.: 142,534

[22] Filed: Oct. 25, 1993

[51] Int. Cl.⁶ .................................................. G06F 17/30
[52] U.S. Cl. .............. 395/600; 395/182.04; 364/DIG. 1; 364/282.4; 364/283.1
[58] Field of Search .................................. 395/600, 425, 395/182.04

[56] References Cited

U.S. PATENT DOCUMENTS

| | | | |
|---|---|---|---|
| 4,864,511 | 9/1989 | Moy et al. | 364/478 |
| 5,072,378 | 12/1991 | Manka | 395/182.04 |
| 5,210,866 | 5/1993 | Milligan et al. | 395/182.04 |
| 5,214,768 | 5/1993 | Martin et al. | 395/425 |
| 5,276,867 | 1/1994 | Kenley et al. | 395/600 |
| 5,416,915 | 5/1995 | Mattson et al. | 395/425 |

FOREIGN PATENT DOCUMENTS

| | | | |
|---|---|---|---|
| 9116711 | 10/1991 | WIPO | G11B 20/18 |
| 9120025 | 12/1991 | WIPO | G06F 3/06 |
| 9120076 | 12/1991 | WIPO | G11B 5/012 |

OTHER PUBLICATIONS

Douglis et al, "Log-Structured File Systems", COMPLOM Spring '89, 27 Feb. 1989 pp. 124–129.
Seltzer, "Transaction Support in a Log-Structured File System", 1993 9th Intl. Conf., 19–23 Apr. 1993 pp. 503–510.
Drapeau et al., "Striped Tape Arrays", 12th IEEE Symposium on Mass Storage Systems, 1993, pp. 257–265.
Kim, "Synchronized Disk Interleaving", IEEE Transactions on Computers, vol. C–35, No. 11, Nov. 1986, pp. 978–988.
Kohl et al., "Highlight: A File System for Tertiary Storage", 12th IEEE Symposium on Mass Storage Systems, 1993, pp. 157–161.
Louis et al., "Safeguarding of Stored Records Against Total Data Loss", IBM Technical Disclosure Bulletin, vol. 14, No. 12, May 1972, p. 3846.
Patterson et al., "A Case for Redundant Arrays of Inexpensive Disks (RAID)", Association for Computing Machinery, 1988, pp. 109–116.
Rosenblum et al., "The Design and Implementation of a Log-structured File System", Association of Computing Machinery, 1991, pp. 1–15.

*Primary Examiner*—Wayne Amsbury
*Attorney, Agent, or Firm*—Thomas R. Berthold

[57] ABSTRACT

A data storage library system, preferably arranged in an array of independent libraries, uses a log-structured file (LSF) data architecture and assigned roles for the individual storage devices in the library. Each library includes a plurality of storage devices, such as optical disk drives, and a store of removable media units, such as optical disks, that are mounted and dismounted from the storage devices. The log-structured library is similar to fixed media systems having LSF data architectures in that it employs a directory to map the local address of a data set to its physical storage location, but is different in that it divides the jobs of reading and writing (log accesses) and garbage collection among the different storage devices of the library. As required, the dismountable media units are moved from the storage area and mounted on a device assigned the appropriate role. The roles assigned to the storage devices are flexible and can change as needed. The system allows both log accesses and garbage collection to occur simultaneously. The garbage collection process segregates the data into "hot" and "cold" segments, according to the age of the data. This allows all the cold data to be located on the same media units, which can then be exported from the library for off-line storage and replacement with new media units.

16 Claims, 10 Drawing Sheets

5,530,850

DATA STORAGE LIBRARY ARRAY WITH LOG-STRUCTURED FILE SYSTEM WHICH ALLOWS SIMULTANEOUS WRITE AND GARBAGE COLLECTION

TECHNICAL FIELD

This invention relates to data storage libraries of dismountable media, such as optical disks and tape cartridges, and in particular to an array of independent libraries using a data organization that improves write and read performance.

BACKGROUND OF THE INVENTION

An optical disk or a magnetic tape library (also called a "jukebox") is a mechanical device capable of mounting units of storage media (e.g., disks or tape cartridges) on a drive in response to access requests from a computer system. A library usually comprises a set of one or more drives, a storage area for unmounted media, recording media, and a robot picker mechanism (possibly more than one) that moves the recording media between the storage area and the drives. Libraries range in physical size from that of a small room containing 1,000 or more media units to a desk top unit containing as few as 8 media units. The storage capacity of the largest library systems is in the Terabyte range, while the smallest libraries may have capacities of only 1 Gigabyte.

Library systems are used in many applications and generally perform their function in a satisfactory manner. There is, however, much room for improvement in the reliability, performance, and flexibility of conventional systems. For instance, most libraries have only one picker mechanism for transporting media to and from its drives. This characteristic is a single mechanical point of failure and represents a major weakness in the reliability of a library. If and when a picker fails, all of the data stored in such a library—possibly Terabytes—is inaccessible until the picker is repaired. Another performance limitation of library systems is their data transfer rate. While individual drives found in optical and tape libraries are of the type that have good data transfer rates, it is generally not possible for the rate of any single data stream from the library to exceed that of a single drive. For some applications, this is a serious drawback. It is also difficult to configure libraries to match the differing needs of applications. Some libraries allow drives to be added in place of media storage space, but in general it is not possible to retrofit a library with additional pickers, higher data transfer rates, or greater capacity.

While some applications would benefit from higher data transfer rates, the major performance limitation of any library of dismountable media is the time required to mount and dismount media units. Separate media units in a library can only be accessed at the rate at which the picker can move the units to and from the drives. Optical disk libraries can require tens of seconds to complete a platter exchange, and tape libraries require even more time. This affects both the write and read performance of the library.

Schemes that provide flexibility in the physical placement of newly-written data have been devised for fixed media. Log-structured file (LSF) systems are described by Rosenblum et al., "The Design and Implementation of a Log-Structured File System", *Association for Computing Machinery* 13th *Symposium on Operating System Principles,* 1991. Log-structured arrays of fixed disks are described in PCT published patent applications WO 91/16711, WO 91/20025, and WO 91/20076, all assigned to Storage Technology Corporation. In a system having an LSF data architecture, new data is always written (appended) to logically blank areas of the storage media. The old version of the data, stored elsewhere, is simply marked as invalid in a directory. The current data and the blank space is called the log. When a read is performed, the directory is consulted to find the current location of the requested data. To ensure that there will always be blank areas for writes in the log, a "garbage collection" process is run in the background to scan the media for logically deleted data segments and collect them together. The key to these LSF systems for fixed media is the "indirection" provided by the directory. Indirection is the mapping of the logical address of a data set to its physical storage location. In a conventional file system, this mapping is fixed; in an LSF file system, it is regularly modified. This approach allows the address of a unit of data to be separated from its physical storage location and gives great flexibility when determining the physical placement of data in the system.

What is needed is a file system for a data storage library that takes advantage of the unique characteristic of dismountable media units and the flexibility of an LSF data architecture to minimize the number of media unit mounts and dismounts, and thereby improve both the write and read performance of the file system.

SUMMARY OF THE INVENTION

The present invention is a data storage library system, preferably arranged in an array of independent libraries, having an LSF data architecture. The log-structured library is similar to fixed media systems having log-structured architectures in that it employs a directory to provide indirection, but is different in that it divides the jobs of reading and writing (log accesses) and garbage collection among the different drives of the library. As required, the dismountable media storage units are moved from the storage area and mounted on a drive assigned the appropriate role. If the unit is to have data written on it, it is mounted on the log drive; if it is to be processed for garbage collection, it is mounted on the garbage collection drive. The roles assigned to the drives are flexible and can change as needed. The system allows both writes and reads to the log drive and garbage collection to occur simultaneously. In addition, the garbage collection process segregates the data into "hot" and "cold" segments, and ultimately into "hot" and "cold" media units, according to the age of the data from the last access by the host computer. In the library system, this allows all the cold data to be located on the same cold media units, which can then be exported from the library for off-line storage and replacement with new media units. Write performance of the library system is improved because the use of drives with assigned roles minimizes the number of mounts of media units. Read performance is improved because writes to the log drive do not generally require mounts of media units so the picker has more time available to handle read requests. Read performance is also improved because hot data becomes located on fewer hot media units, thereby decreasing the number of mounts required and increasing the likelihood that a media unit containing the data requested to be read will already be mounted.

For a fuller understanding of the nature and advantages of the present invention, reference should be made to the following detailed description taken together with the accompanying figures.

DETAILED DESCRIPTION OF THE INVENTION

Redundant Arrays of Independent Libraries (RAIL)

Figure 1:
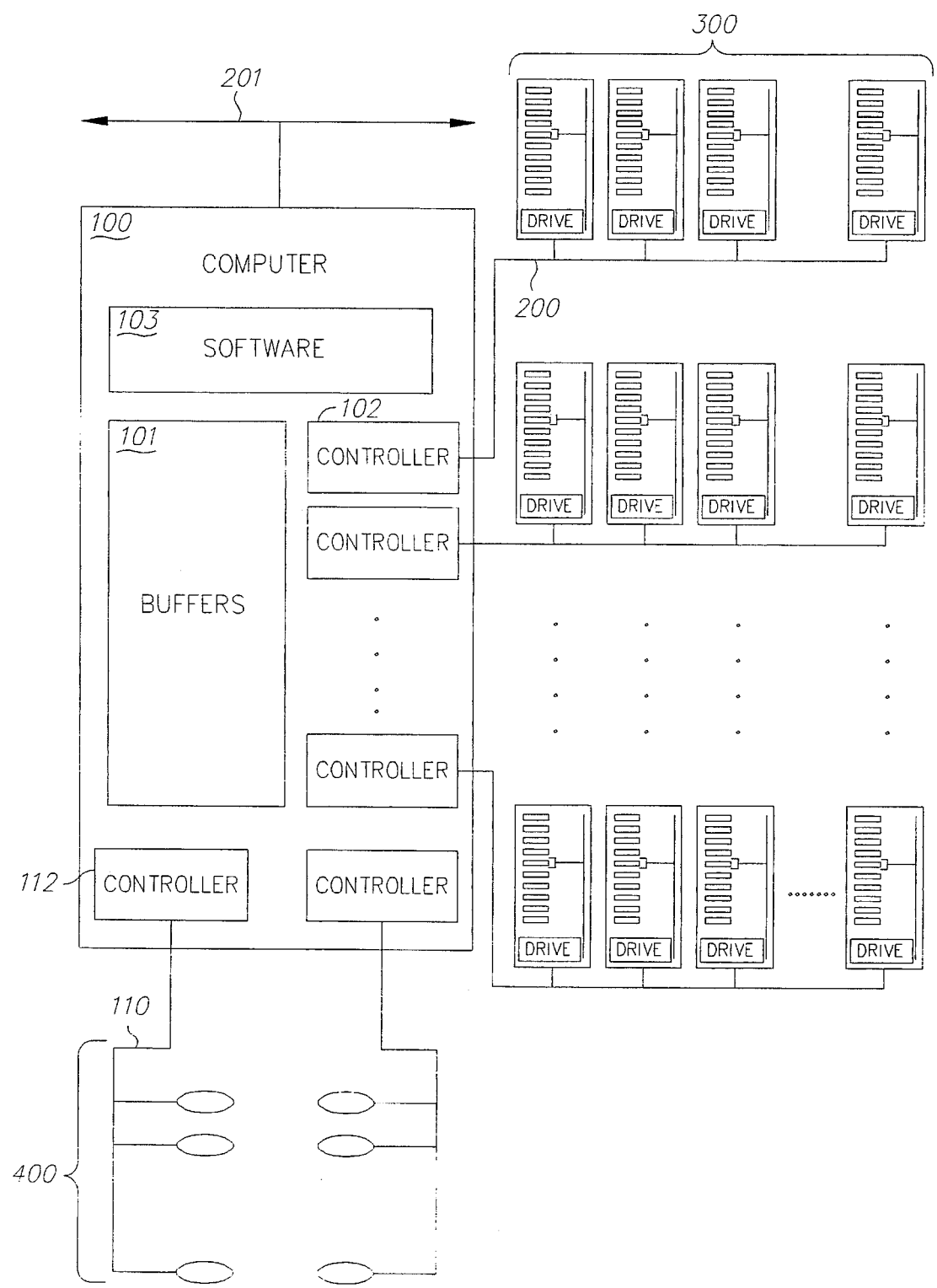
FIG. 1 is a block diagram of a computer system attached to a library array.

An array of libraries comprises two or more libraries connected to a computer or controller and organized in such a manner that logical data sets are stored on more than one of the libraries. The diagram of FIG. 1 illustrates the system. The computer 100 of the array of libraries contains buffers 101 stored either in main memory or on nonvolatile secondary storage devices (e.g., fixed disks 400) and one or more interface controllers (one for each interface bus used in the array), such as typical controller 102 attached to typical interface bus 200. The buffers 101 serve to store the results of recent library access requests so that some future requests can be resolved without accessing the libraries. Some buffers 101 are also used to reorganize data as it moves between the array of libraries and the computer 100. The computer 100 may be attached to a communications channel, such as a network 201, over which it transmits and receives access requests and data.

Attached to each interface bus in the array, such as typical bus 200, are one or more libraries of dismountable storage media (optical disk or tape cartridges), such as the typical string of libraries 300. The array includes not just those individual libraries attached to one interface controller (such as libraries 300 on bus 200 attached to controller 102), but all other libraries on other buses in the system. Also attached to the computer 100 are a number of other secondary storage devices, such as typical optical or magnetic fixed disks 400 connected by interface bus 110 to controller 112. A software routine 103 runs on the computer 100 and accepts access requests for a storage device and translates those requests into one or more access requests to one or more of the libraries in the array.

The manner in which access requests to the library storage device represented by the array are translated into requests to the individual libraries that make up the array depends upon the configuration of the array itself. The distinguishing features of the various types of array configurations are the manner in which data is spread across the libraries and the placement of redundant data. Different configurations or organizations of redundant arrays (RAID) are known for fixed disks, as described by Patterson et al., "A Case for Redundant Arrays of Inexpensive Disks (RAID)", *Proceedings of ACM SIGMOD*, Chicago, Ill., June 1–3, 1988, pp. 109–116.

The Log-structured Library Array

The present invention will be described in the context of a single library, although it will be understood that the invention is also applicable to arrays of independent libraries organized according to RAID architectures.

The data storage space in LSF architectures is organized into a number of equal-sized divisions called segments. Each segment is further subdivided into smaller storage units which are the units that can be logically addressed (i.e., sectors or tracks). The contents of the segments are indexed through two data structures: the log directory and the segment directory. The log directory performs the translation between logical and physical data addresses. It is a table that contains the storage media index, the segment number on that media unit, and the offset of the data from the start of the segment. The size of the log directory is generally quite small (~0.02%) relative to the size of the data being stored. The log directory typically resides on magnetic disk and is cached in the main memory of the controlling computer for quick access. The segment directory is a small table stored in each segment. It contains a time stamp, a pointer to the segment directory of the segment written just prior to its own, and a list of the contents of the segment (duplication of part of the log directory). The time stamp and pointer are for crash recovery; in the event of a complete system failure, the segments can be scanned and the log directory reconstructed (i.e., find the segment with the latest time stamp and then scan backward filling in the log directory).

Figure 2:
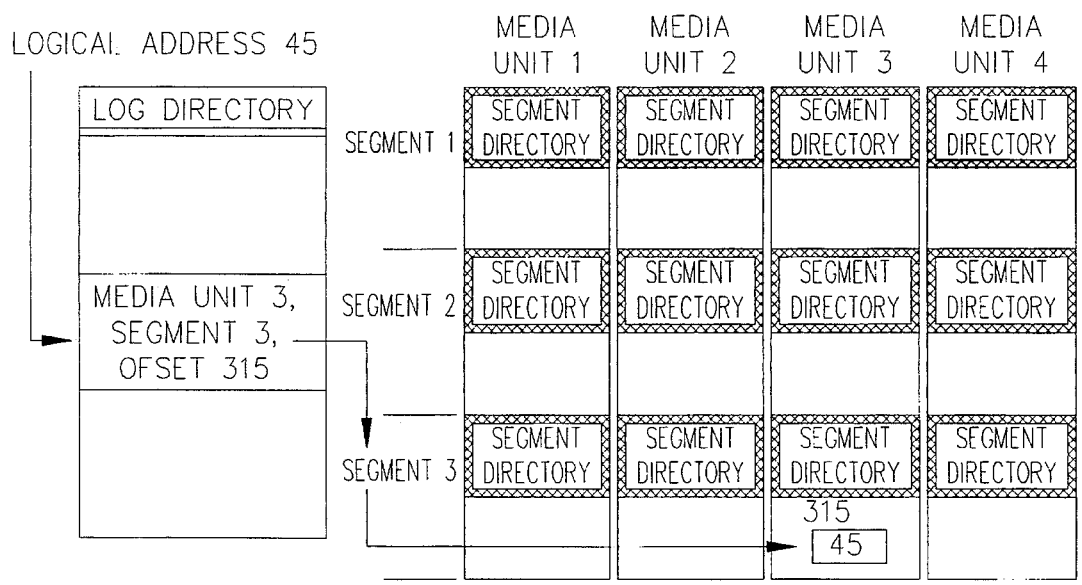
FIG. 2 is a diagram illustrating an LSF system as applied to a library.

This organization is shown in the diagram in FIG. 2 in the form of four media units (units 1–4), each of which is logically divided into three segments (segments 1–3). In the example of FIG. 2, the logical sector or track address 45 is translated via the log directory into the physical address of media unit 3, segment 3, offset 315. If data were to be written to that logical address 45 at a later date, the new data would be assigned to a different physical location (most likely a different segment) and the entry in the log directory would be updated to reflect the new physical location. The old physical storage location represented by segment 3 on media unit 3 will eventually be reclaimed by the garbage collection process and be made available again for the writing of new data.

The garbage collection process has the task of alleviating the segment fragmentation that occurs as new data is written and old versions of the data are abandoned. In practice, several complete segments will be read in, their contents compacted into as few segments as possible, and then new segments written out, after which the log directory is updated. According to the present invention, in a log-structured library array the tasks of log access and garbage collection are assigned to different drives. For example, in a simple library array consisting of libraries with two drives each, one drive in each library is the log drive while the other drive is the garbage collection drive. In this arrangement, the log drive keeps a media storage unit mounted collecting all write traffic, while the garbage collection drive systematically processes the rest of the media storage units in the storage area of the library. In the preferred implementation, the assignment of roles to the individual drives is not fixed, but is adjustable to match the workload. For instance, if the workload is read intensive, both drives can be used to satisfy read requests; if the workload is write intensive, both drives can perform writes (with the provision that some garbage collection must occur to free space).

The selection of which segments to clean in the garbage collection process is a function of the dynamic nature of the data they contain. Cleaning segments that contain recently written and frequently changing data (called "hot" data) is not as efficient as cleaning segments that contain older and less volatile data (called "cold" data). The benefit of cleaning segments with hot data is generally short lived. The contents of cold segments, however, tend not to change so the benefit of cleaning them to reduce fragmentation lasts longer.

The cleaning process can also separate the hot data in a segment from the cold to promote the formation of hot and cold segments. This segregation is of benefit because it reduces the number of times hot data is cleaned, as the garbage collection process tends to pay more attention to the cold segments. In the present invention, this segregation is extended in a log-structured library array to create hot and cold media storage units. The mounting of a media storage unit is an expensive operation that should not be wasted on data that is not likely to be accessed. By creating hot and cold media units, the write and read performance of the library array is improved by increasing the amount of hot data that tends to be on each media unit that is mounted. This minimizes the number of mounts required to handle write requests, and the resulting reduced demand on the picker also frees the picker to handle additional read requests, which improves read performance. Cold media units are also excellent candidates for removal from the library array for replacement with newly-formatted media units.

Data Segregation and Access Characterization in Log-structured Library Array

Figure 3A:
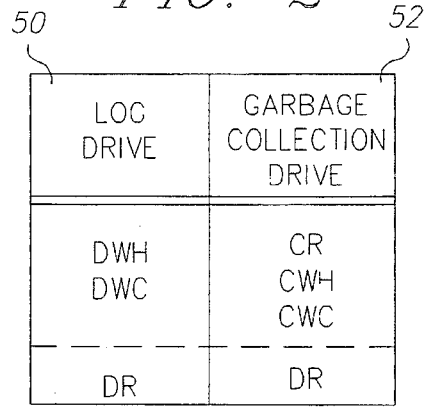
FIG. 3A is a diagram illustrating one type of drive assignment for segregating data in a log-structured library array having two drives in each independent library.
Figure 3B:
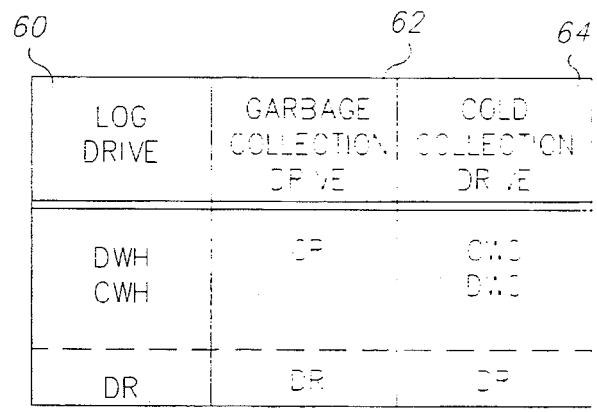
FIG. 3B is a diagram illustrating one type of drive assignment for segregating data in a log-structured library array having three drives in each independent library.

The present invention using the above-described concepts of drives with assigned roles and hot and cold media can be understood with reference to FIGS. 3A and 3B.

In the log-structured library array, a data access, i.e., a read or a write, is characterized as either an external demand access (i.e., from an application) or an internal access (i.e., garbage collection). The types of access are further characterized as being an access to either hot or cold data. For external accesses, the distinction between a demand hot and a demand cold write is passed by the particular application making the requests. For example, writes to a database log (not to be confused with the write log) and those of a database load utility are cold because the written data is likely to remain unaccessed for some time.

In the following description, acronyms are used to describe the different types of accesses. An external write request of hot data is labeled as a DWH (Demand Write Hot) access, a garbage collection write of hot data is labeled as CWH (Collection Write Hot), and a garbage collection write of cold data is labeled as CWC (Collection Write Cold). For both demand and collection reads, hot and cold data are not separately labeled so a demand read is labeled DR and a collection read CR.

Consider, for example, the assignment to an array with libraries having two drives (log drive 50 and garbage collection drive 52), as illustrated in FIG. 3A. In that assignment, all demand writes (DWH and DWC) are handled by the log drive 50 and all collection accesses (CR, CWH and CWC) are handled by the garbage collection drive 52. Demand reads (DR) are handled by either of drives 50, 52, depending upon the workload and current activities, and when they have the data being requested. In this arrangement, called "a uniform platter temperature system", the garbage collection drive 52 is responsible for general clean up of the media storage units by recovering invalidated space, compacting and compressing segments, and possibly placing data on the media units to improve performance (e.g., by moving data to the middle tracks on an optical disk or to the middle of a tape so that seek distances are minimized).

In the assignment illustrated in FIG. 3B, there are three roles for the drives. There is a log drive 60, a garbage collection drive 62, and a "cold collection" drive 64. This arrangement is called the "hot platter/cold platter system" (or hot tape/cold tape system if the library array is an array of individual tape libraries). The log drive 60 has the job of writing all hot data (DWH and CWH), while the cold collection drive 64 has the job of writing all cold data (CWC and DWC). The garbage collection drive 62 reads hot and cold data (CR) and sends it to the appropriate drive 60, 64 for writing. Demand reads (DR) are handled by any of the drives 60, 62, 64 as workload and current activities dictate. Thus, the systems of FIGS. 3A and 3B are applicable for 1-, 2-, or 3-drive libraries, although multiple drives clearly offer the best performance when there is significant write activity. The hot/cold platter system of FIG. 3B has the feature that it tends to collect old (cold) data on specific media units. The advantage of this is that these media units can then be exported from the library array. This is a unique feature of the library array using the log-structured file system in that data can be reorganized by media storage units. Hot units remain mounted (which reduces mounts), and cold units containing obsolete data are exported from the array.

Preferred Embodiment

Figure 4:
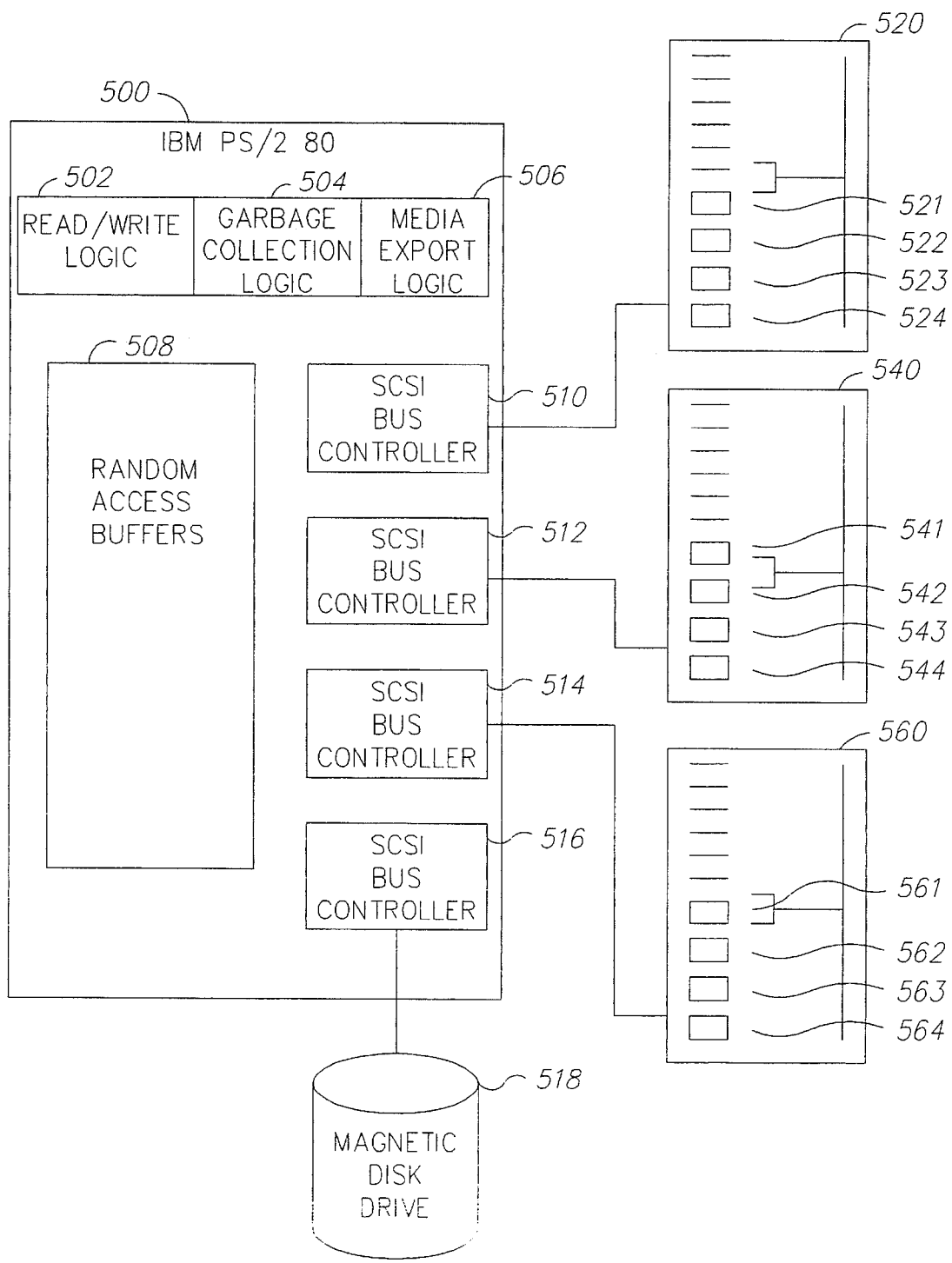
FIG. 4 is a block diagram of a preferred hardware and software environment illustrating an LSF system for an array of libraries, each library having drives with preassigned roles for specific LSF functions.

The preferred configuration of the present invention is illustrated in FIG. 4 and comprises five main physical components: a host computer 500 in the form of an IBM PS/2 Model 80 with 16 Megabytes of semiconductor main memory, a 100 Megabyte magnetic disk drive 518 attached to the computer 500, and three IBM Model 3995 optical disk libraries 520, 540, 560. The host computer 500 may be a dedicated computer whose primary function is to manage the data storage and retrieval on the libraries, such as would be the case in a network of other computers whose function is to run specific software applications. Alternatively, computer 500 may run other software applications as well as manage the data storage on the libraries.

The libraries 520, 540, 560 are attached to the computer 500 by individual industry standard Small Computer System Interface (SCSI) buses that are attached to respective SCSI controllers/adapters 510, 512, 514. Other hardware and software subcomponents of the system reside inside the computer 500 and the libraries 520, 540, 560. The software in the computer 500 includes file system controller software, Read and Write (R/W) logic 502, Garbage Collection logic 504, and Media Export logic 506. These logic modules 502, 504, 506 are portions of a software program stored on the fixed-disk drive 518. In operation, a copy of the program or portions of the program are loaded into the main memory of the computer 500 when needed. In addition to SCSI bus controllers/adapters 510, 512, 514, the hardware in the computer also includes SCSI bus controller/adapter 516 attached to fixed-disk drive 518 and random access memory buffers 508.

Inside each of the libraries 520, 540, 560 are four optical disk drives: drives 521, 522, 523, 524 in the first library 520; drives 541, 542, 543, 544 in the second library 540, and drives 561, 562, 563, 564 in the third library 560. Each library 520, 540, 560 also includes a storage space for optical disks and a picker to mount and dismount disks from the drives.

There are four basic operations in the LSF system according to the present invention for the dismountable media located in each of the libraries 520, 540, 560 of the array: read of data, write of data, garbage collection, and media export. Each of these operations of the system will be described within the context of the first library 520 illustrated in FIG. 4 and the assignment of roles to the drives 521, 522, 523, 524. The operation of the system within the context of the other libraries 540, 560 is the same as for library 520.

Figure 5:
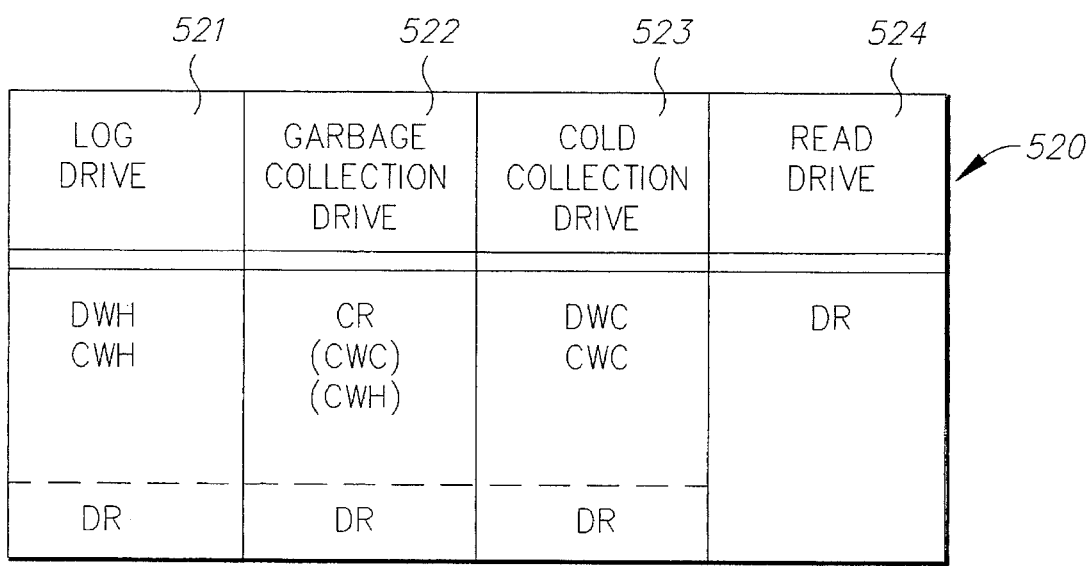
FIG. 5 is a diagram illustrating the drive assignment for segregating data in the system of FIG. 4, wherein the libraries in the array have four drives each.

Referring to FIG. 5, the assigned roles for the drives in library 520 will be described. Drive 521 in the library 520 is assigned the role of being the log drive; it writes all of the data associated with hot data write requests, Demand Write Hot (DWH), and Collection Write Hot (CWH).

Drive 522 is assigned the role of being the garbage collection drive; it is used to periodically do Collection Reads (CR) of the contents of each optical disk in the library in order to reclaim abandoned storage space and reorganize the contents of the library. In relatively rare instances to be described, the garbage collection drive 522 will also do write requests for cold and hot data during the collection process (CWC and CWH).

Drive 523 is assigned the role of being the cold collection drive; its job is to write data that will not be accessed frequently. There are two sources of this type of data known to be cold: one is internal from the garbage collection drive 522, Collection Write Cold (CWC), as it reads data that has not been accessed for some user specified threshold; the other is external from applications that identify cold data to the log-structured file system, Demand Write Cold (DWC).

Drive 524 is assigned the role of being the read drive; it processes all external demand read requests, Demand Read (DR), that are for data that does not reside on disks in any of the other three drives, i.e., the other drives will also process DRs for data on disks that are already mounted on those drives.

For both read and write requests, the basic unit of data transfer is a logical sector. A logical sector consists of a fixed number of physical contiguous sectors stored on the disk. The size of a segment in the file system is chosen to be an integral multiple of the logical sector size.

The operation of the file system with respect to the assigned drive roles described above is illustrated in the flow charts in FIGS. 6–9 as described below.

1. READ Operation

Figure 6:
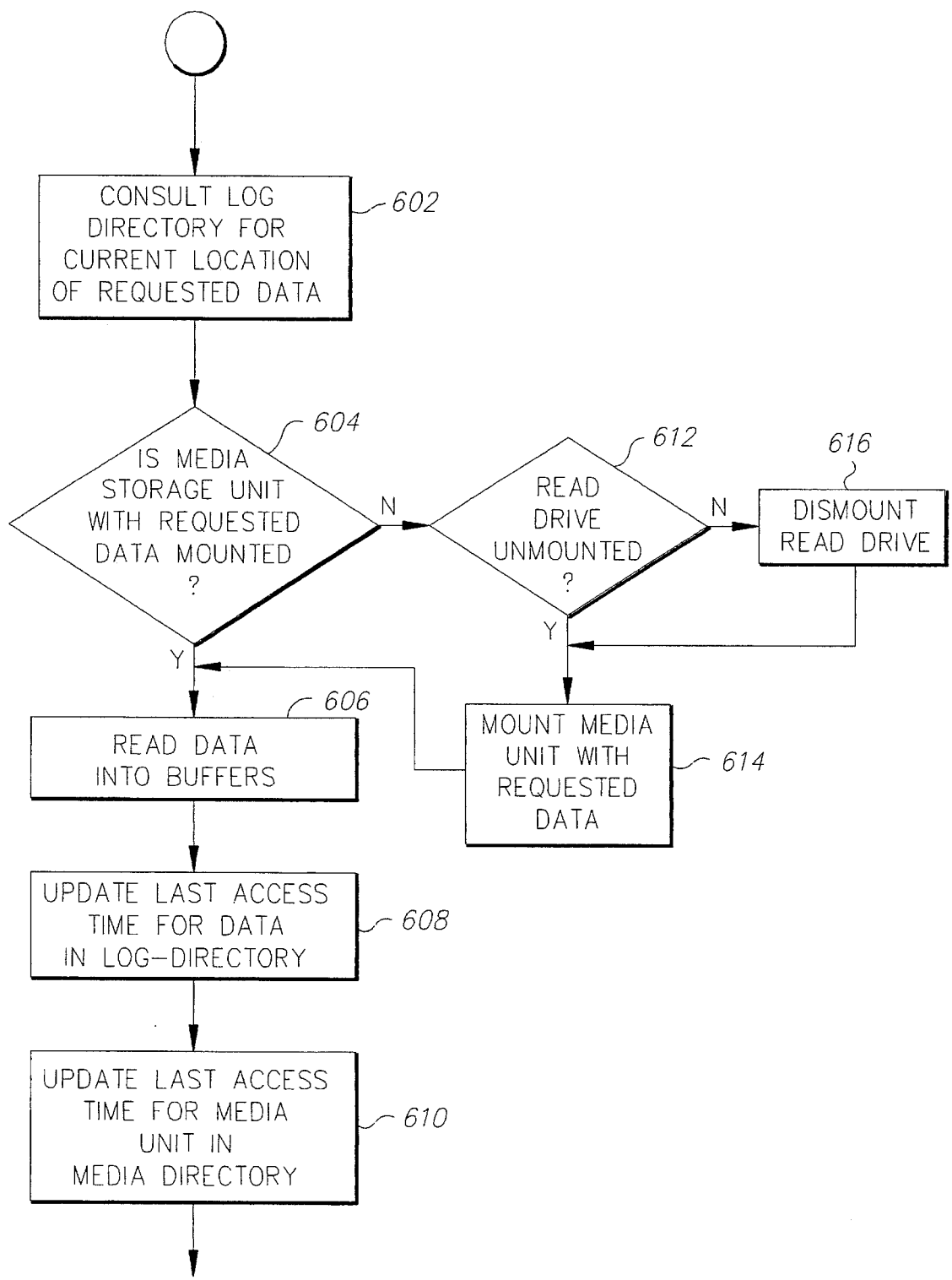
FIG. 6 is a flow chart illustrating the read operation for the system of FIG. 4.

The operation of the read component of the file system running on the computer 500 controlling the libraries 520, 540, 560 is illustrated in FIG. 6. When the R/W logic 502 receives a data read (DR) request, it first consults the log directory to determine the physical address of the requested data, given its logical address (602). It then determines if the media unit specified in the physical address is mounted (604) on any of the four drives 521, 522, 523, 524 in library 520. If it is, the R/W logic 502 reads the data (606) from the specified segment at the specified offset into a portion of the buffers 508 in the computer 500. It then updates the last access time kept in the log directory for the requested logical address (608) and the last access time of the disk kept in the media directory (610).

If the media unit specified in the physical address is not mounted on any of the four drives in the library 520, then the R/W logic 502 determines if the read drive 524 is unmounted (612). If yes, it mounts the specified media (614) onto the read drive 524 and proceeds to read the specified data (606). If the read drive is not already mounted, the R/W logic 502 dismounts whatever media unit is currently mounted (616), and then proceeds to mount the specified media unit (614).

After the data has been retrieved and stored (606) in the file system buffers 508, it is transferred to the buffers of the requester and the reading is completed.

2. WRITE Operation

Figure 7A:
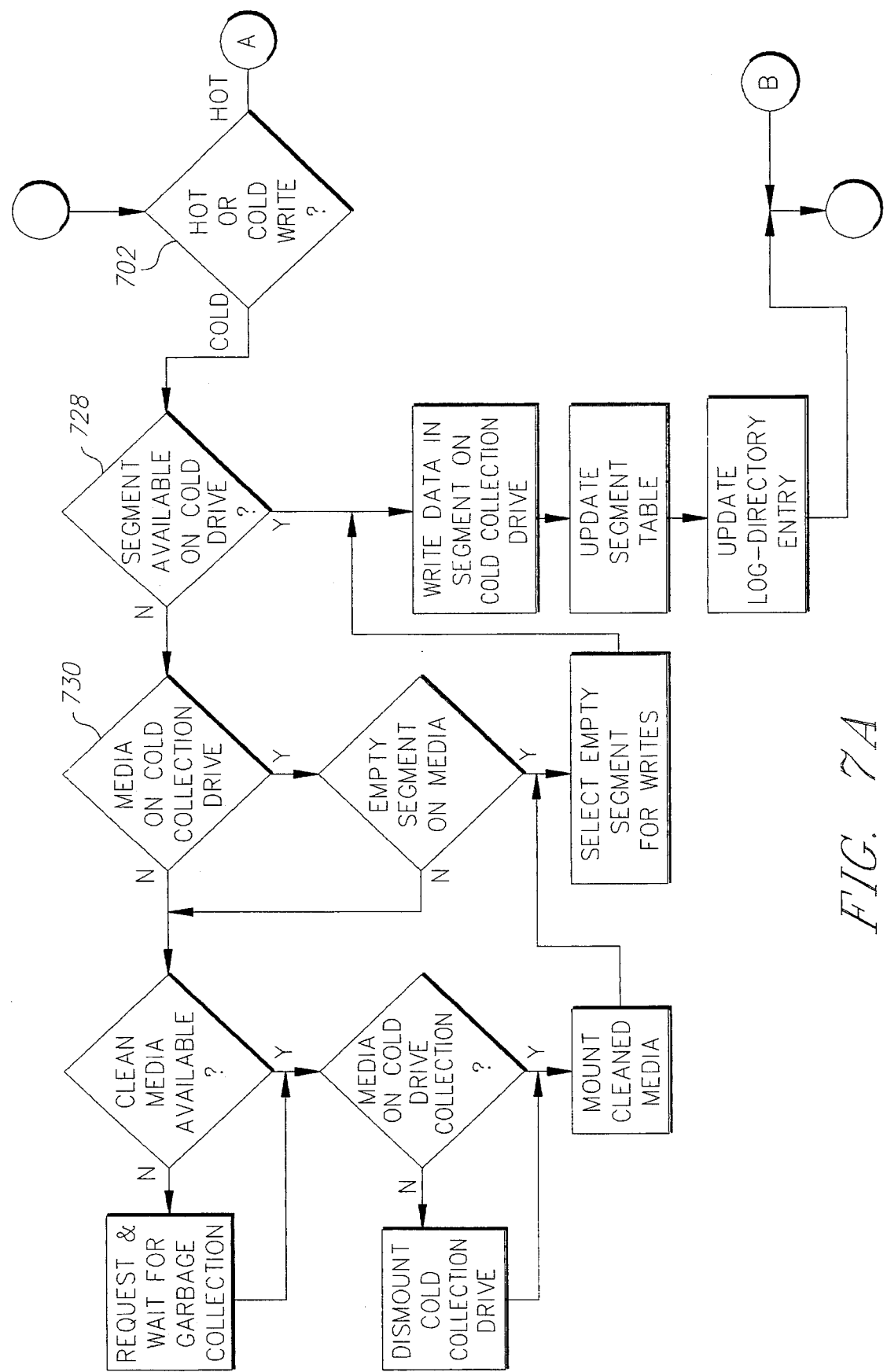
FIGS. 7A and 7B are a flow chart illustrating the write operation for the system of FIG. 4.
Figure 7B:
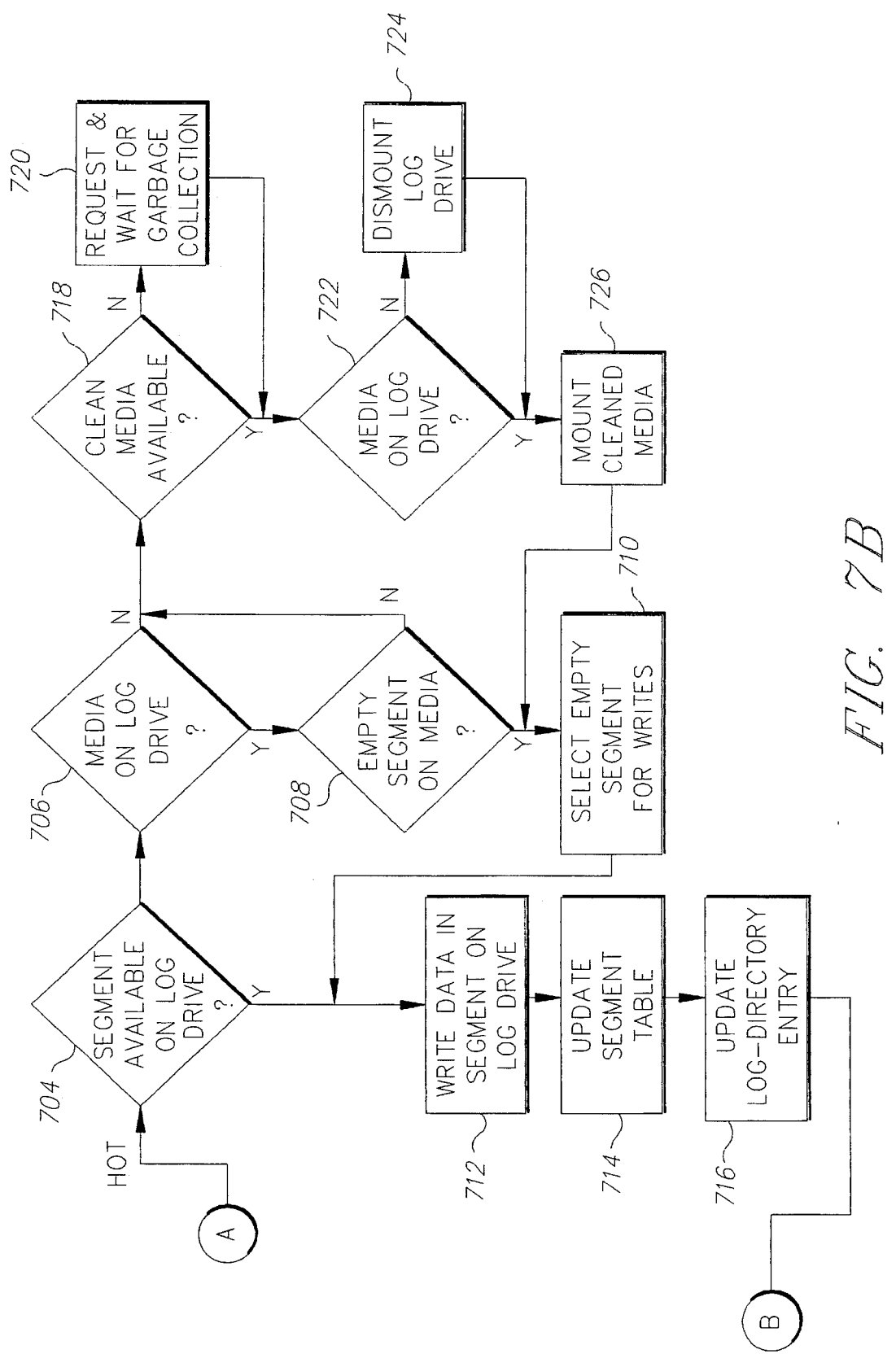

The operation of the write function of R/W logic 502 of the file system is illustrated in the flow chart of FIGS. 7A and 7B. When R/W logic 502 receives a write request, it first determines if the request is to write hot data (DWH) or cold data (DWC) (702). If the request is to write hot data, it then determines if a segment is available on the log drive 521 for writing hot data (704), as shown in FIG. 7B. If not, it checks if there is a media unit mounted (706) on the log drive 521, and if there is, it determines if there is currently a segment on that media unit that is empty (708). If yes, it selects an empty segment (710) and the data is written in that segment (712) on the log drive 521, the segment table on the media is updated (714), and the entry in the log directory for the logical address of the data being written is updated (716) to store the current media unit, segment index, offset in the segment, and the last access time for the data.

If after determining that there is not a segment selected for writing hot data (704) and determining that there is not a media unit mounted (706) on the log drive 521, the write component of R/W logic 502 checks if there is a clean media unit, i.e., one with empty segments available to be mounted (718). If no, it requests that garbage collection be started and waits for one clean media unit to be made available (720). When a clean media unit is available, then the log drive 521 is again checked to see if it is unmounted (722). If no, then the media unit in log drive 521 is dismounted (724). If and when the log drive 521 is unmounted, a clean media unit is mounted (726) on the log drive 521 and the process of selecting an empty segment (710) and writing the data (712) continues.

Referring now to FIG. 7A, if the write request (702) is for cold data (DWC or CWC), the process is exactly as described above for a hot write, except that instead of using the log drive 521, the cold collection drive 523 is used and checked to see if a segment is available (728) and if media is mounted (730).

3. GARBAGE COLLECTION Operation

Figure 8A:
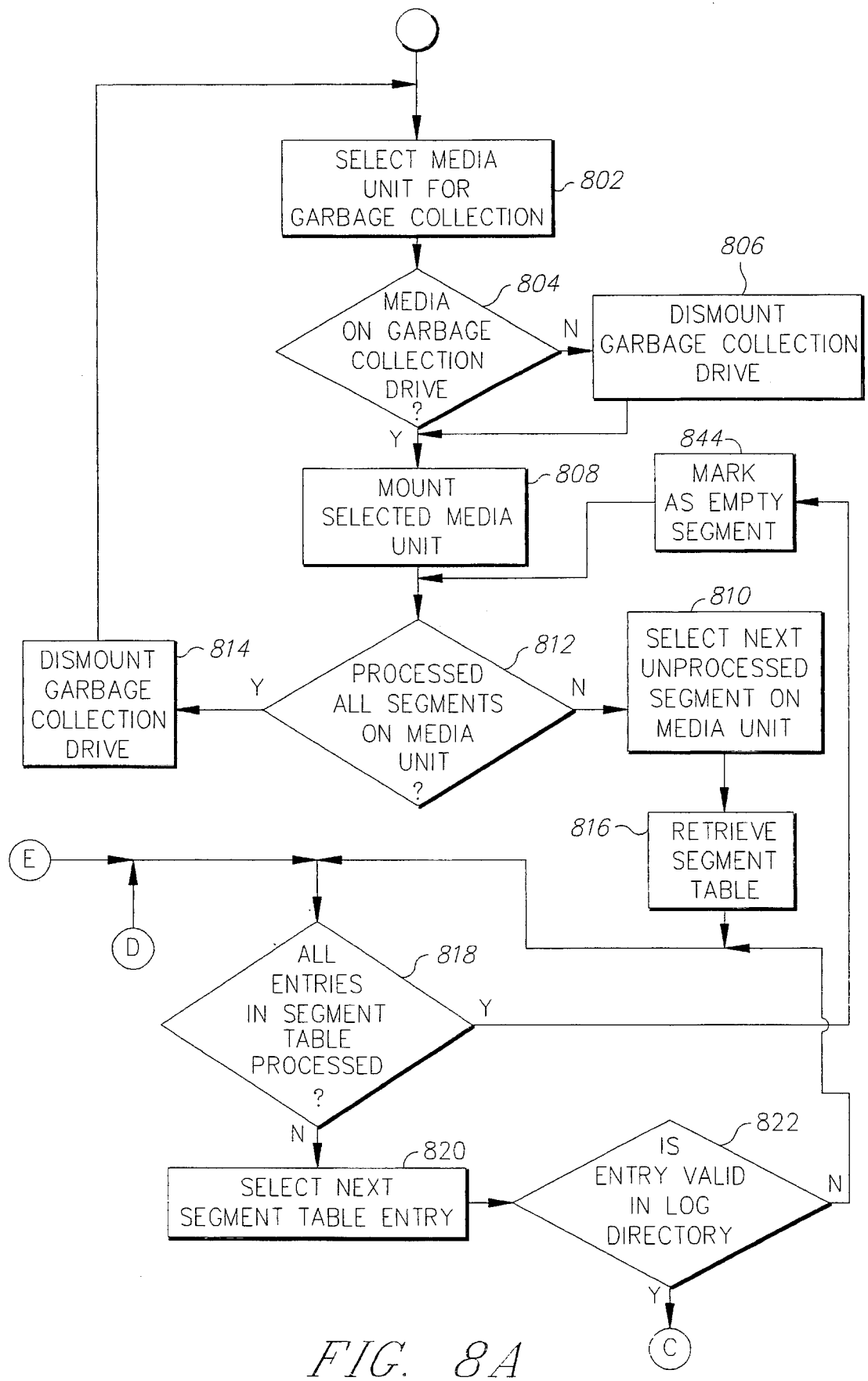
FIGS. 8A and 8B are a flow chart illustrating the garbage collection operation for the system of FIG. 4.
Figure 8B:
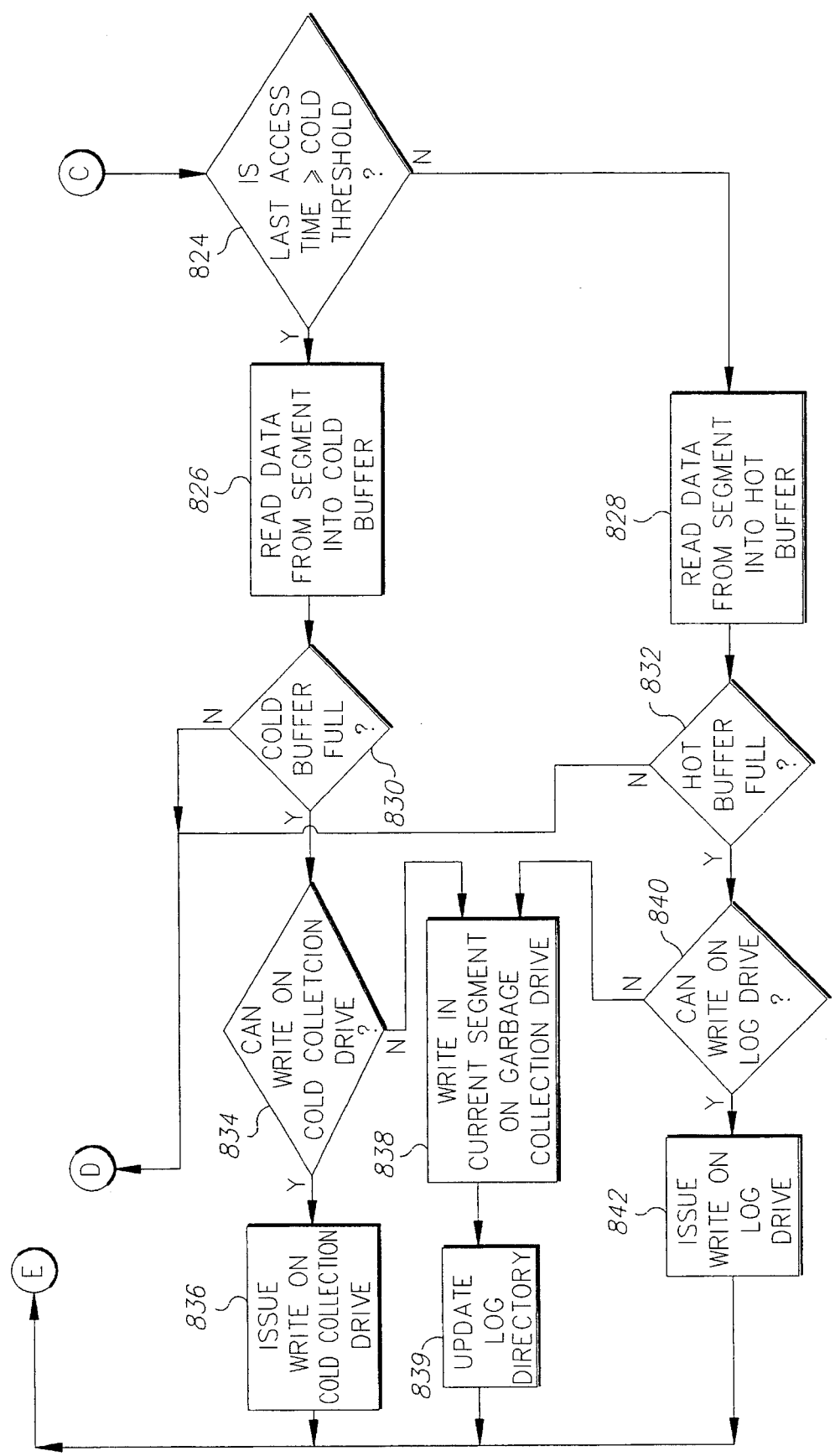

The operation of the garbage collection logic 504 of the file system is illustrated in the flow chart of FIGS. 8A and 8B. After it is initiated, the garbage collection logic 504 first determines if there is a media unit that is a candidate for cleaning (802). If there is one, it continues; however, if there is not, the garbage collection logic 504 pauses and waits for one to become a candidate.

Once the media unit to be cleaned is selected, the garbage collection drive 522 is checked to see if it is unmounted (804) and if not, the media unit mounted on it is dismounted (806). The selected media unit is then mounted (808) and the processing of the segments is begun (810). When all segments have been processed on the media unit (812), the garbage collection drive 522 is dismounted (814) and the cycle continues with the selection of the next media unit for garbage collection (802).

The processing of the segments on the selected media unit to be cleaned is sequential and begins with the retrieval of the segment table (816). When all segment table entries have been processed (818), garbage collection logic 504 continues with the selection of the next segment (812). Each segment table entry is processed sequentially (820) and tested to see if the log directory for the data still points to the segment and offset stored in the segment table (822). If yes, the data is still valid; if no, then the data for the entry is no longer valid and the garbage collection logic 504 moves on to process the rest of the segment table entries (818).

For entries which are still valid, they are tested to see if the time difference between the current time and the time of the last access for the data is greater than or equal to the specified "cold" threshold (824), as shown in FIG. 8B. The cold threshold is a value corresponding to the age of the cold data; it is a predetermined value but can be varied depending on the particular application. If the cold threshold is exceeded, then the data for the entry is read into a "cold segment" buffer (826) located in the RAM buffers 508.

If the cold threshold is not exceeded, the data for the entry is read into a "hot segment" buffer (828) located in the RAM buffers 508. If the cold segment buffer is not yet full (830), the garbage collection logic 504 returns to processing the rest of the segment table entries (818). (This part of the process (832) occurs similarly for the hot segment buffer.) If the cold segment buffer is full, then a check is made (834) for the ability to write the contents of the buffer on the cold collection drive 523. If the contents of the cold buffer can be written on the cold collection drive 523, then a write request (CWC) is issued (836); however, if the write cannot be completed, then the cold segment buffer contents are written on the media unit in the garbage collection drive 522 in a previously cleaned segment (838) and the log directory is updated (839). If this is the first segment being cleaned, it is selected. This use of the garbage collection drive 522 for the role of doing CWCs and CWHs is not expected to occur except on the relatively rare occasions when writing cannot take place in the cold segment buffer or on the cold collection drive 523. This part of the process also occurs similarly for the hot segment buffer (840), but with respect to the log drive 521. If the hot segment buffer contents can be written on the log drive 521, a request is issued (842); if not, it is written (838) on the media unit in the garbage collection drive 522 and the log directory is updated (839).

After the writes, the processing of the remaining segment table entries continues. When all of the segment table entries have been processed (818), the segment is marked as an empty segment (844) and its availability to be written on is recorded. If the first segment was overwritten with itself because a write was not possible on log drive 521 or the cold collection drive 523, then the segment would not be marked as empty.

4. MEDIA EXPORT Operation

Figure 9:
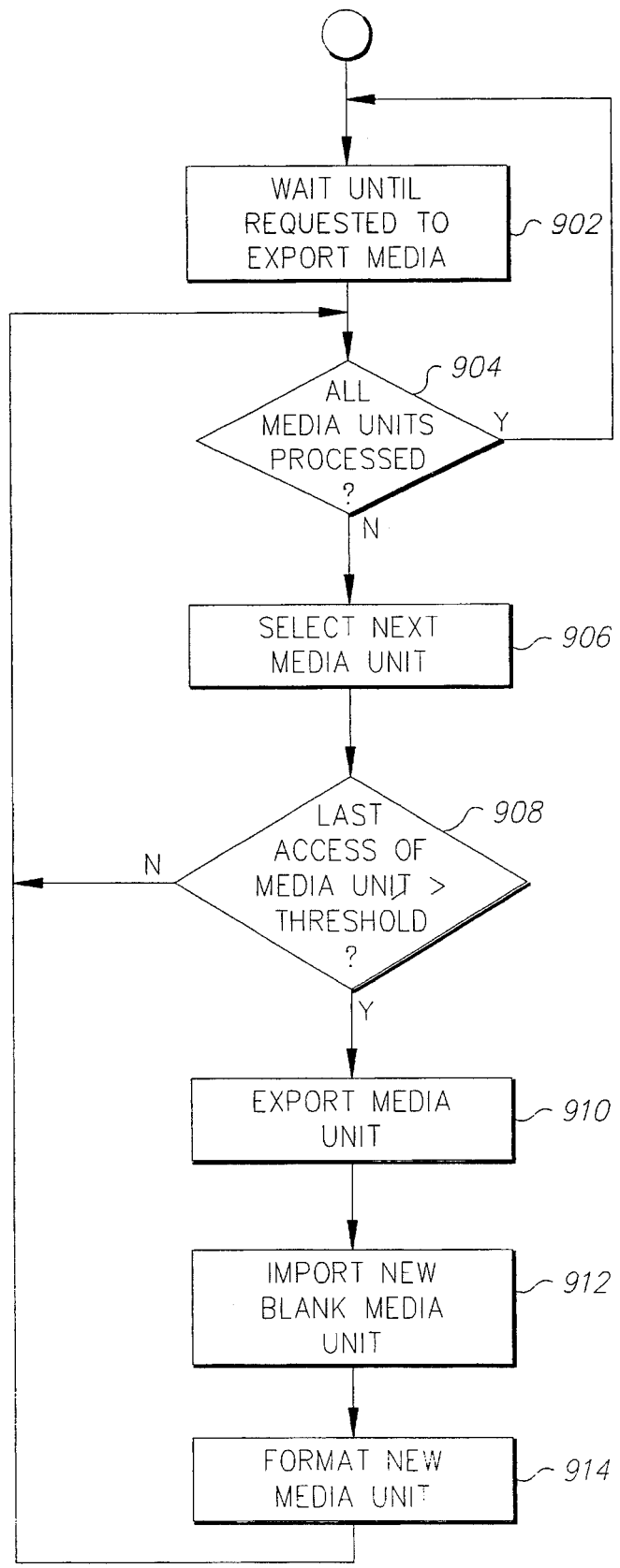
FIG. 9 is a flow chart illustrating the media export operation for the system of FIG. 4.

The operation of the media export logic 506 of the file system is illustrated in FIG. 9. The media export logic 506 waits until a user requests that media units be exported (902). It then checks to see if all of the media units have been examined (904) to see if they should be exported, and if they have, then the media export logic 506 returns to waiting for the next media export request from the user.

If not all of the media units have been processed, the next media unit in turn is selected (906) and the last access time for the media unit is examined. If the elapsed time between the present time and the last access time is greater than or equal to a user-specified threshold (908), then the media unit is exported (910) and a new blank media unit is imported (912) and formatted (914) to replace it.

Extension of Log-structured File Systems to Redundant Arrays of Independent Libraries (RAIL)

The concept of dedicated drives for dismountable media in a log-structured file system can be extended to a system having more than a single library, e.g., a redundant array of library storage devices. A typical configuration would be one that matched the corresponding drives in each of the independent libraries so that each library operates as described above for library 520 and has a log drive, a garbage collection drive, a cold collection drive, and a read drive. Data is then striped across the drives in such a way that part of a segment is stored on one media unit in one library and the next part of the segment is stored on another media unit in the next library, and so on across the number of libraries in the array. The last library is a "parity" library which stores the parity computed from each of the parts of the striped segment. For example, if the system illustrated in FIG. 4 were configured as a RAIL system, a fourth library would be the parity library, and each drive in that library would be a parity drive assigned to the corresponding group of drives from each of the other libraries 520, 540, 560, e.g., the first drive in the parity library would be the parity drive assigned to the log drives 521, 541, 561 so that when writing to the log drives, the segment is spread over the log drives 521, 541, 561 with parity being written to the parity drive in the parity library. The assigned parity library has the advantage that none of the parity drives are located in a library that also contains data, so that in the event of a failed picker drive, media unit, etc. in one of the libraries, the data can still be reconstructed and made available to an application. The libraries and drives in the array operate synchronously, each performing exactly the same operations.

More buffering of segments is used to collect entire segments before they are written to the array. This addition allows the parity of the segment to be computed once and eliminates the need to read, modify, and write the data and read, modify, and write the parity of the segment, thus preserving the fast write performance that is characteristic of log-structured file systems.

While the preferred embodiments of the present invention have been illustrated in detail, it should be apparent that modifications and improvements may be made to the invention without departing from the spirit and scope of the invention as described in the following claims.

What is claimed is:

1. A data storage system for storing and retrieving data in response to requests from a host computer, the system being of the type wherein data is written to and read from the storage media according to a log-structured file data architecture having the data organized in segments, the system comprising:

a plurality of media units, some of the media units being stored;

a plurality of storage devices for writing data to and reading data from media units that are retrieved from their stored location and mounted on the storage devices, one of the storage devices being a log device assigned for writing data to a mounted media unit in response to a write request from the host computer and another of the storage devices being a garbage collection device assigned for reading data segments from media units other than the media unit mounted on the log device;

means for collecting the data segments read by the garbage collection device for subsequent writing by a storage device to a media unit; and means for mounting and dismounting the media units to and from the storage devices, the mounting and dismounting means including means for retrieving media units from their stored location and successively mounting them on the garbage collection device while the log device is writing data to its mounted media unit, whereby garbage collection occurs on the garbage collection device and data writing occurs on the log device simultaneously.

2. The data storage system according to claim 1 wherein the means for collecting the segments read by the garbage collection device includes means for identifying cold data segments older than a predetermined age threshold, and wherein the storage device for writing the collected cold segments is the garbage collection device, whereby some of the media units come to contain essentially only cold data segments.

3. The data storage system according to claim 2 further comprising means, responsive to a determination that the time of the last read request from the host computer for data located on a cold media unit is older than a predetermined threshold, for identifying cold media units as export media units for subsequent export from the storage system.

4. The data storage system according to claim 1 wherein the means for collecting the segments read by the garbage collection device includes means for identifying cold data segments older than a predetermined age threshold, and wherein one of the storage devices other than the log and garbage collection devices is a cold collection device for writing collected cold segments, whereby some of the media units come to contain essentially only cold data segments.

5. The data storage system according to claim 4 further comprising means, responsive to a determination that the time of the last read request from the host computer for data located on a cold media unit is older than a predetermined threshold, for identifying cold media units as export media units for subsequent export from the storage system.

6. The data storage system according to claim 1 wherein the storage device for reading data in response to a read request from the host computer is either the log device or the garbage collection device, and further comprising means for determining if the data requested to be read is located on a media unit mounted on either the log device or the garbage collection device.

7. The data storage system according to claim 1 wherein one of the storage devices other than the log and garbage collection devices is a read device for reading data in response to a read request from the host computer, and wherein the mounting and dismounting means includes means for retrieving a media unit from its stored location and mounting it on the read device if the data requested to be read is not located on a media unit already mounted on the read device.

8. The data storage system according to claim 1 wherein the log device is the first log device in the plurality of storage devices, and further comprising:

a second log device synchronized with the first log device; and means responsive to a write request from the host computer for sending a first portion of a data segment to be written to the first log device and a second portion of the data segment to be written to the second log device.

9. The data storage system according to claim 8 wherein one of the storage devices is a parity device for writing parity data corresponding to the portions of data segments written on the first and second log devices.

10. The data storage system according to claim 1 wherein the media units are optical disks and the storage devices are optical disk drives.

11. A data storage system for storing and retrieving data in response to requests from a host computer, the system being of the type wherein data is written to and read from the storage media according to a log-structured file data architecture having the data organized in segments, the system comprising:

a library having a plurality of media units, a plurality of drives including an assigned log drive for writing data segments to a media unit in response to a write request from the host computer and an assigned garbage collection drive for reading data segments from media units other than the media unit on the log drive while the log drive is writing data, a picker for mounting and dismounting the media units to and from the drives, and a storage location for storing media units not mounted on the drives; and means for collecting the data segments read by the garbage collection drive and for sending the collected data segments to a drive, other than the log drive, to be written on a media unit, the collecting means including means for identifying cold data segments as those data segments older than a predetermined age threshold, whereby some of the media units come to contain essentially only cold data segments.

12. The data storage system according to claim 11 wherein the drive for writing the collected data segments is an assigned cold collection drive.

13. The data storage system according to claim 11 further comprising means, responsive to a determination that the time of the last read request from the host computer for data located on a cold media unit is older than a predetermined threshold, for identifying cold media units as export media units for subsequent export from the library.

14. The data storage system according to claim 11 wherein one of the drives other than the log and garbage collection drives is an assigned read drive for reading data in response to a read request from the host computer, and wherein the mounting and dismounting means includes means for retrieving a media unit from its stored location and mounting it on the read drive if the data requested to be read is not located on a media unit already mounted on the read drive.

15. The data storage system according to claim 11 wherein the library is the first library and further comprising:

a second library, each of the drives in the second library having a corresponding drive in the first library and being synchronized with the drives in the first library; and means responsive to a write request from the host computer for sending a first portion of a data segment to be written to the log drive in the first library and a second portion of the data segment to be written to the log drive in the second library.

16. The data storage system according to claim 15 further comprising:

a parity library, each of the drives in the parity library corresponding to the drives having the same assignment in the first and second libraries and being synchronized with the drives in the first and second libraries; and wherein the means for sending portions of the data segments to the log drives in the first and second libraries includes means for sending parity data to the parity log drive in the parity library.

* * * * *